United States Patent [19]
Cowan et al.

[11] Patent Number: 5,415,774
[45] Date of Patent: May 16, 1995

[54] FILTRATION SYSTEM

[75] Inventors: Fredrick J. Cowan, Kingwood; Earl B. Damron, College Station; Larry W. Johnson, Katy; Shelby L. Howell, Channelview, all of Tex.

[73] Assignee: Greenland Industries, Inc., Kingwood, Tex.

[21] Appl. No.: 115,870

[22] Filed: Sep. 2, 1993

[51] Int. Cl.⁶ ............................................. B01D 35/30
[52] U.S. Cl. .................................. 210/266; 210/282; 210/283; 210/482
[58] Field of Search ............... 210/282, 473, 474, 476, 210/514, 266, 283, 232, 482

[56] References Cited

U.S. PATENT DOCUMENTS

| | | | |
|---|---|---|---|
| 626,238 | 6/1899 | Knapp | 210/244 |
| 690,457 | 1/1902 | Parker | 210/244 |
| 707,873 | 8/1902 | Spencer | 210/244 |
| 2,167,225 | 7/1939 | Van Eweyk | 210/501 |
| 2,456,524 | 12/1948 | Meincke, Jr. | 210/244 |
| 2,738,105 | 3/1956 | Wolfer et al. | 210/244 |
| 3,536,197 | 10/1970 | Ward | 210/170 |
| 3,630,683 | 12/1971 | Robb | 23/253 A |
| 3,747,767 | 7/1973 | Hankammer | 210/282 |
| 4,419,235 | 12/1983 | Sway | 210/282 |
| 4,443,336 | 4/1984 | Bennethum | 210/238 |
| 4,689,147 | 8/1987 | Leoncavallo et al. | 210/232 |
| 4,714,550 | 12/1987 | Malson et al. | 210/244 |
| 4,990,254 | 2/1991 | Toida et al. | 210/476 |
| 5,167,819 | 12/1992 | Iana et al. | 210/474 |
| 5,240,620 | 8/1993 | Shalev | 210/767 |

FOREIGN PATENT DOCUMENTS 251438  5/1926  United Kingdom ............... 210/282

OTHER PUBLICATIONS

"Hygiene TM Water Purification Process Description of Material and Design Practice," Technical Bulletin, Ionics Incorported, 1992.

*Primary Examiner*—Ivars Cintins
*Attorney, Agent, or Firm*—Guy McClung

[57] ABSTRACT

A water filtration device is disclosed which, in one aspect, has a hollow device body with filter apparatus therein. The device body is removably nested in a device extender which, upon removal from the device body is invertible and re-emplaceable on the device body to provide an extended member for facilitating the scooping water to be flowed through the device. With appropriate filter media in the hollow device body, potable water is produced. A system is disclosed including the device body, device extender, and a water container securable beneath the device body to receive and store the purified water flowing from the device body.

19 Claims, 4 Drawing Sheets

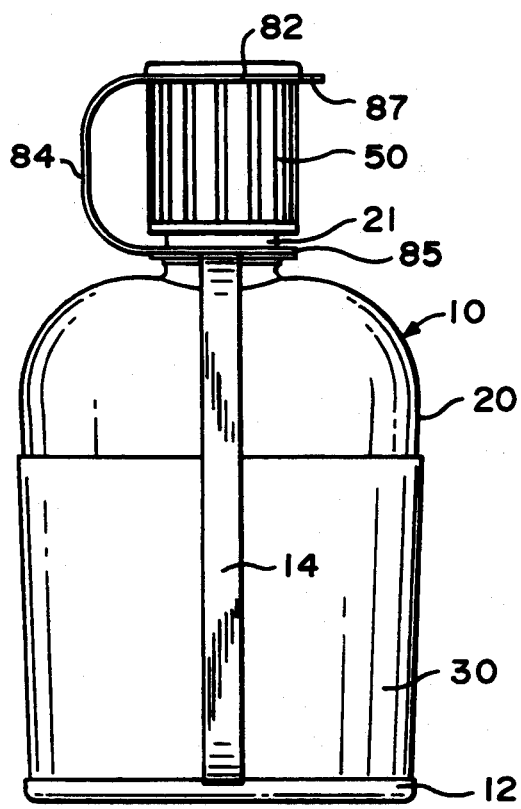
FIG. IA
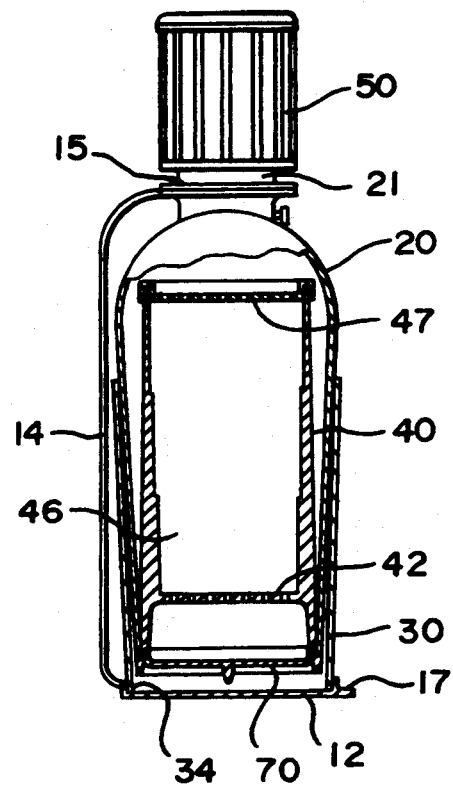
FIG. IB
FIG. IC
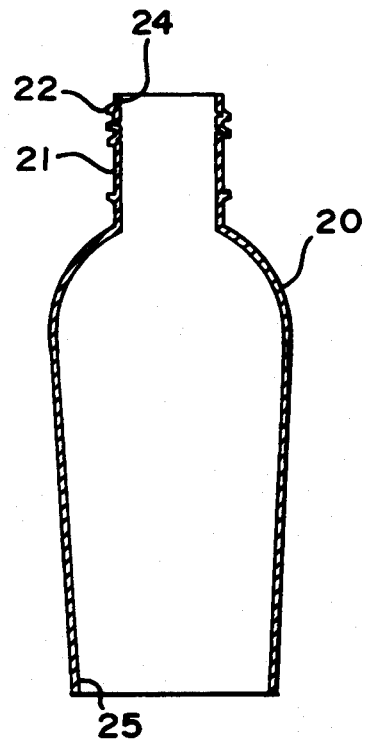
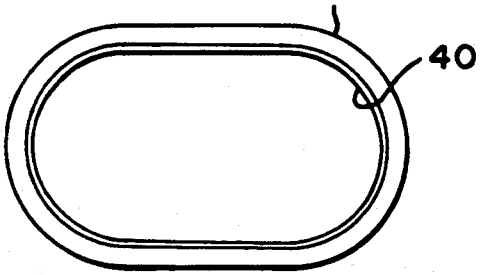
FIG. ID
FIG. IE

FILTRATION SYSTEM

BACKGROUND OF THE INVENTION

1. Field Of The Invention

This invention is directed to a filtration system for producing filtered, preferably potable, water; in one aspect to a flow-through filtering scoop; and, in one aspect, to a system with dual elements, one for filtration and one for collection and storage of filtered water.

2. Description of Related Art

The prior art discloses a variety of water containers with associated or built-in filters. The prior art also discloses a variety of dual element filtration systems for producing filtered water.

U.S. Pat. Nos. 626,238; 690,457; 707,873; 2,738,105; 4,443,336; 4,714,550; and 5,167,819 disclose water containers or canteens with interior purification or filtering apparatus.

U.S. Pat. Nos. 2,167,225; 2,456,524; 3,536,197; 3,630,683; 4,419,235; and 4,689,147 disclose filter devices with an upper receiving container or funnel; an intermediate filter means; and a lower container to receive filtered water. The upper containers are releasable or removable from the filter means or from a lower container.

SUMMARY OF THE PRESENT INVENTION

The present invention teaches, in one aspect, a water purification device with one or more filters therein. The present invention discloses, in another embodiment, a water collection, purification, and storage system which includes a extender or collector which is connected on top of a lower container. The collector includes filtration apparatus therein including one or more screens or filters and, in one aspect apparatus for regulating water flow rate to maintain a desired water residence time in and through the filter(s). When more than one filter is used, identical filter media may be employed in all filters or different filter media may be employed in different filters. In one embodiment a pop-in pre-filter is used to remove coarse material such as pebbles, grass, weeds, etc.

In one preferred embodiment the collector and the lower container are substantially the same size with similar internal volumes. For example, both the collector and the lower container may be configured as military canteens so that an individual soldier carries a balanced load on her or his web belt; or one soldier may carry the containing canteen and one soldier may carry the collector canteen. A connector which is, in one embodiment, a separate removable integral body, is interposed between the collector and the lower container. A neck of the collector and of the lower container can fit into the connector with a force fit; or threads can be provided on the connector and on the collector and container for threaded engagement. In another embodiment the connector may be formed integrally of either the collector or of the lower container.

In one method of use, closure members are removed from both ends of the collector and from a top end of the lower container. The collector is inverted and a collector neck is screwed into a top end of a connector. The lower container is screwed into a bottom end of the connector. The collector end is then submerged in or passed through a water supply, scooping up water and substantially filling the collector. The apparatus is maintained in an upright position, allowing the water to flow down through filter(s) in the collector, through the connector, and into the lower container. When flow ceases, the connector is disconnected from the lower container and a closure member, e.g. a screw cap, is screwed over the lower container's neck opening. In another method according to this invention, a removable pre-filter is placed in the collector prior to scooping up water for purification. In one embodiment a pop-in, snap-in, or otherwise removable filter or pre-filter may be the only filter employed in the apparatus.

In one embodiment the collector has a certain configuration and is open at both ends. An auxiliary collector for facilitating water input is removably secured to a top open end of the collector to make it easier to collect a desired quantity of water for purification (purification including but not limited to the removal of pathogens by filter media). The auxiliary collector is, in one aspect, sized and configured so that the collector snugly nests within the auxiliary collector.

One preferred filter media useful for rendering contaminated water potable is HYgene (TM) filter media available from Ionics, Incorporated, Bridgeville, Pa.

It is, therefore, an object of at least certain preferred embodiments of the present invention to provide:

New, useful, unique, efficient, non-obvious devices and methods for purifying water;

Such devices and methods including a water collector with one or more filters therein and, in one aspect, with an easily insertable and removable filter or pre-filter;

Such devices and methods with a dual element system including a collector with one or more filters therein and a container for receiving water filtered through the collector;

Such methods and devices including apparatus in the collector for slowing down water flow rate so that residence time of the flowing water optimizes purification and filtration efficiency;

Such methods and devices in which a removable filter (or filters), either re-usable or not, are used which are easily inserted into the collector and removed therefrom;

Such devices and methods which with an auxiliary collector for facilitating collection of water to be purified; and in one particular aspect such devices in which the collector snugly nests within the auxiliary collector; and Such devices and methods which utilize a connector for connecting the collector and a lower container together.

Certain embodiments of this invention reside not in any particular individual feature, but in combinations of them herein disclosed and claimed and are distinguished from the prior art in these combinations with their structures and functions. There has thus been outlined, rather broadly, features of certain embodiments of the invention in order that the detailed descriptions that follow may be better understood, and in order that the present contributions to the arts may be better appreciated. There are, of course, additional features of the invention that are described hereinafter and which may form the subject matter of the claims appended hereto. Those skilled in the art who have the benefits of this inventions teachings will appreciate that the conceptions, upon which this disclosure is based, may be utilized as a basis for the designing of other structures, methods and systems for carrying out the purposes of the present invention. It is important, therefore, that the claims be regarded as including any legally equivalent constructions and methods insofar that do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by references to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

FIG. 1A is a side view of a device according to the present invention. FIG. 1B is a side partial cross-sectional view of the device of FIG. 1A. FIG. 1C is a side cross-sectional view of a device body of the device of FIG. 1A. FIG. 1D is a partial view of a neck of the device body of FIG. 1C. FIG. 1E is a top cross-sectional view of the device of FIG. 1A.

DESCRIPTION OF EMBODIMENTS PREFERRED AT THE TIME OF FILING FOR THIS PATENT

Figure 2A:
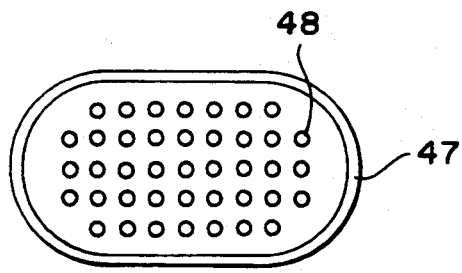
FIG. 2A is a top view of a plate for a filter body according to the present invention.
Figure 2B:
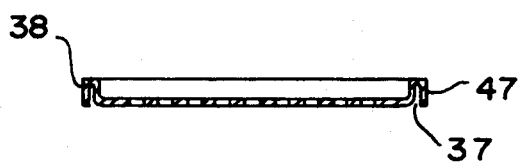
FIG. 2B is a side cross-sectional view of the plate of FIG. 2A.

FIGS. 1A-1E show a filter apparatus 10 according to the present invention. The apparatus 10 has a body 20 in which is mounted a filter holder 40. A portion of the body 20 is removably disposed in an extender 30. A connector 50 is threadedly secured on a neck 21 of the body 20. A cover 12 closes off a bottom end opening 34 of the extender 30. A plate 47 is secured across a top opening 44 of the filter holder 40.

Figure 6A:
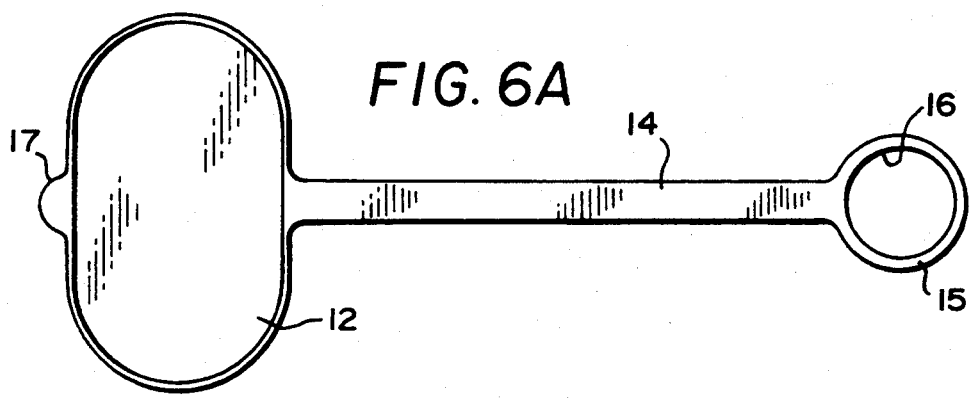
FIG. 6A is a top view of a cover according to the present invention.
Figure 6B:
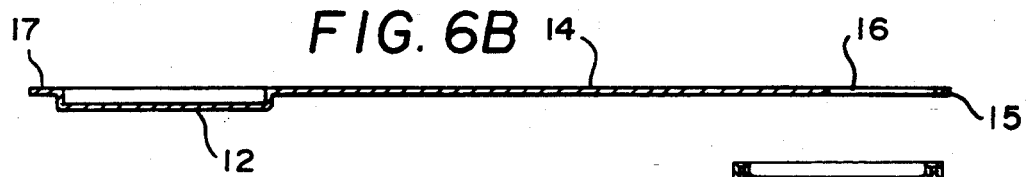
FIG. 6B is a side cross-sectional view of the cover of FIG. 6A.
Figure 7A:
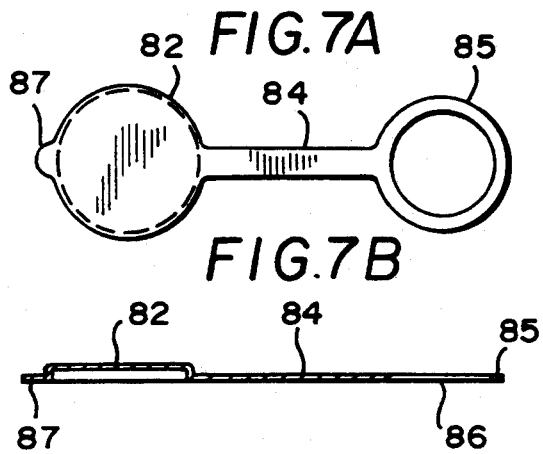
FIG. 7A is a top view of a holder according to the present invention.
Figure 7B:
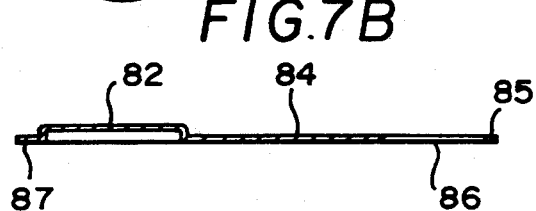
FIG. 7B is a side cross-sectional view of the holder of FIG. 7A.

As shown in FIGS. 1B, 6A, and 6B, a tab 17 extends from the cover 12 to facilitate removal of the cover 12 from the extender 30. A band 14 connects the cover 12 to a ring 15 with a hole 16. The ring 15 encircles the neck 21 of the body 20 so that the cover 12 is connected to the apparatus 10 when the cover 12 is not secured to the extender 30. As shown in FIGS. 1A, 7A and 7B a cover 82 for closing off a top opening 54 of the connector 50 has a tab 87 for facilitating removal of the cover 82 from the connector 50. A band 84 connects the cover 82 to a ring 85 with a hole 86. The ring 85 encircles the neck 21 of the body 20 so that the cover 82 is connected to the apparatus 10 when the cover 82 is not over a top opening 54 of the connector 50.

Figure 3A:
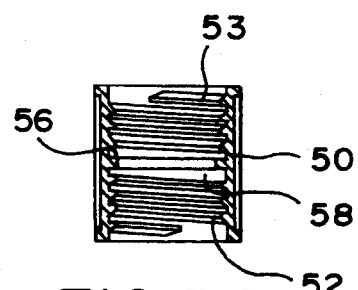
FIG. 3A is a side cross-sectional view of a connector of the device of FIG. 1A.

As shown in FIGS. 1C and 1D, the neck 21 of the body 20 has threads 22 for threadedly mating the neck 21 with interior threads 52 of the connector 50 (FIG. 3A). A stop 26 prevents further tightening of the connector 50 on the neck 21.

Figure 5B:
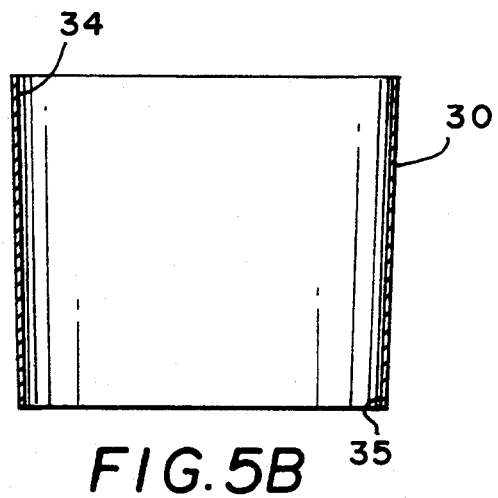
FIG. 5B is a side cross-sectional view of the extender of FIG. 5A.

In the apparatus 10, the body 20 has a top opening 24 in the neck 21 and a bottom opening 25. The body 20 tapers from a larger circumference at its top (as viewed in FIG. 1C) to a smaller circumference at its bottom. As shown in FIGS. 1B and 5B, the scoop 30 has a corresponding tapered configuration permitting nesting of the body 20 in the extender 30 as well as easy removability of the body 20 from the extender 30. The extender 30 has a top end opening 34 and a bottom end opening 35. The cross-sectional shape of the body 20 and the extender 30 are similar. As shown they are elliptical, but it is within the scope of this invention for them to be square, rectangular, circular, or polyhedral and, preferably, they are sized and configured so the body 20 nests within the extender 30. Although it is also within the scope of this invention for sides of the body and extender to be vertical (as viewed e.g. in FIG. 1B), it is preferred that the sides be slightly tapered for ease of manipulation.

Figure 3B:
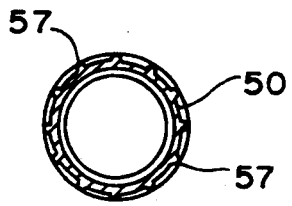
FIG. 3B is a top cross-sectional view of the connector of FIG. 3A.
Figure 5A:
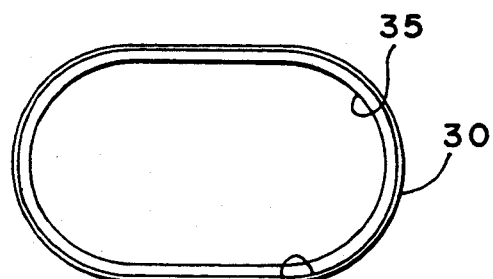
FIG. 5A is a top view of an extender according to the present invention.
Figure 9:
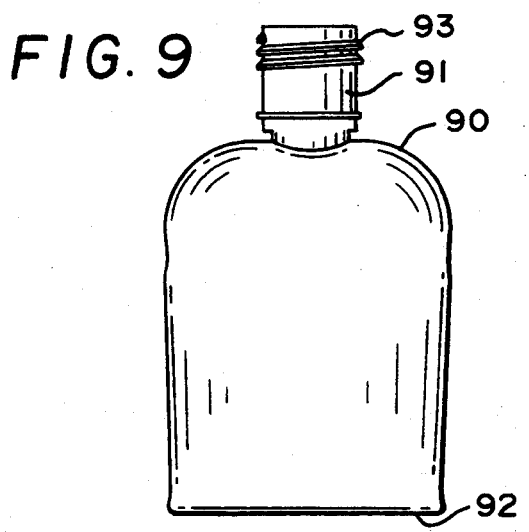
FIG. 9 is a side view of a container according to the present invention.

The connector 50 as shown in FIGS. 1B, 3A, and 3B has two sets of interior threads 52 and 53. The threads 52 facilitate securement of the body 20 to the connector 50 and the threads 53 facilitate securement of a container (not shown in FIG. 3A) to the connector 50 so that when a extender according to this invention is disposed above a container connected to the extender via the connector, water flows through the extender, through a central channel 58 of the connector, and into the container. An interior stop 56 abuts end portions of items (e.g. the neck 21) connected to the connector 50. Exterior ribs 57 facilitate rotation of the connector 50. FIG. 9 shows a container 90 which is similar to the body 20 but has a solid bottom 92. A neck 91 of the container 90 has threads 93 for threadedly connecting the container 90 to the connector 50.

FIGS. 1B, 2A, 2B, 4A, and 4B illustrate various filter devices of the apparatus 10. The hollow filter holder 40 has a body 41 defined by a side wall 49. A perforated plate 42 extends across the body 41 and has perforations or holes 43 therethrough for the passage of water. Filter media 46 is disposed within the body 41. It may occupy some or all of the space within the body 41 and is, preferably secured and held in place by a plate 47. The plate 47 has perforations or holes 48 for the passage of water. A lip 38 and a portion of the plate 47 define a recess 37 in which is held a top edge 36 of the body 41 so that the plate 47 is held across a top opening 44 of the body 41.

The bottom end of the filter apparatus 40 is sealingly secured to the bottom end of the body 21. Thus upon inversion of the apparatus 10 from its position as shown in FIG. 1B, water flows through the filter holder 40.

Figure 4A:
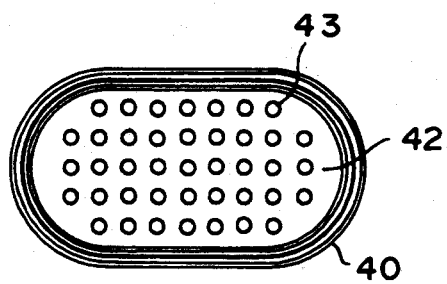
FIG. 4A is a top view of a filter apparatus according to the present invention.
Figure 4B:
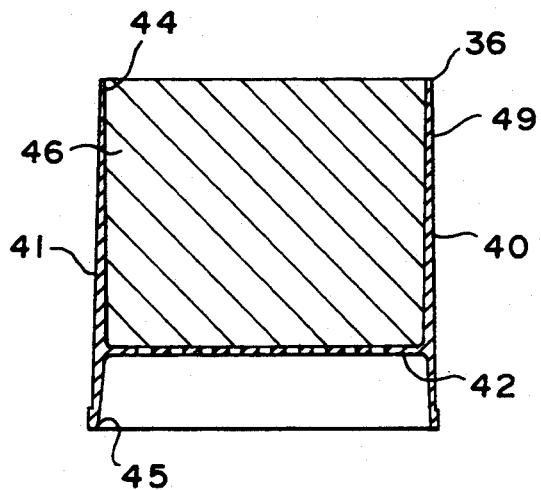
FIG. 4B is a side cross-sectional view of the filter apparatus of FIG. 4A.
Figure 8:
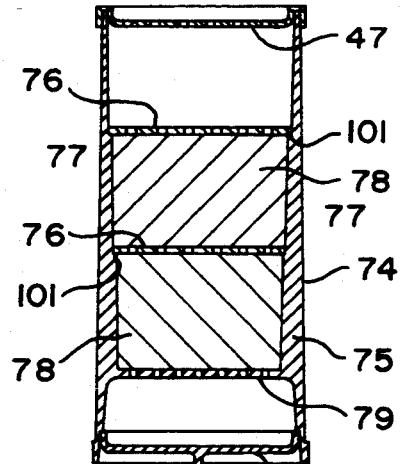
FIG. 8 is a side cross-sectional view of a filter apparatus according to the present invention.

FIG. 8 illustrates another embodiment of a filter device (like the holder 40) for use with the apparatus 10. A filter apparatus 74 has a body 75 with a plurality of weirs, screens or plates 76 extending thereacross and resting on a shoulder 101. Holes 77 are positioned in the plates 76 to slow down the flow of water through the apparatus 10. The plates may be substantially horizontal or inclined as desired to achieve a desired water flow rate, desired water residence time in the collector, and thus a desired amount of filtration. Filter media layers 78 between adjacent pairs of plates 76 may be identical or media with different properties (different material, different density, different fiber size, different pore size, etc.) may be used. A plate 79 is like the plate 42 (FIG. 4B).

Figure 10A:
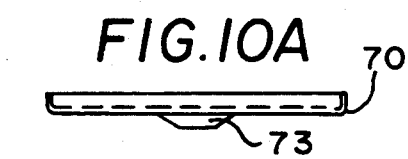
FIG. 10A is a side view of a filter disc according to the present invention.
Figure 10B:
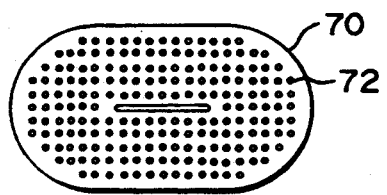
FIG. 10B is a top view of the disc of FIG. 10 A.
Figure 10C:
FIG. 10C is a side cross-sectional view of the disc of FIG. 10B.

FIGS. 10A and 10B illustrate a disc insert 70 which serves as a pre-filter and is removably insertable into a bottom end opening of the body 75 or 41. A small knob or bar 73 extending from a body 71 of the disc 70 facilitates handling of the disc 70. Holes 72 extend through the disc 70. This media may be coarse or fine for a filter or pre-filter. Filter media (not shown) may also be installed in the disc. The disc 70 may be used in conjunction with the filter media 78 or 46 or the filter media may be eliminated and the disc alone used.

Figure 11:
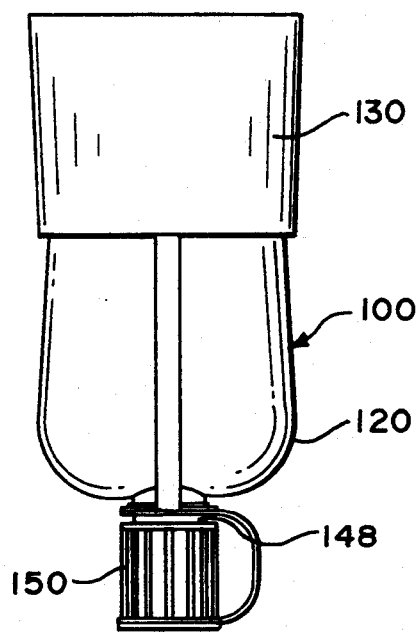
FIG. 11 is a side view of a device and filter apparatus according to the present invention.

FIG. 11 illustrates an apparatus 100 like the apparatus 10 with an extender 130 inverted and re-emplaced on a bottom end of a body 120 and with the body 120 also inverted. A flow through connector 150 (like the connector 50) is removably secured on a neck 148 of the body 120.

Figure 12:
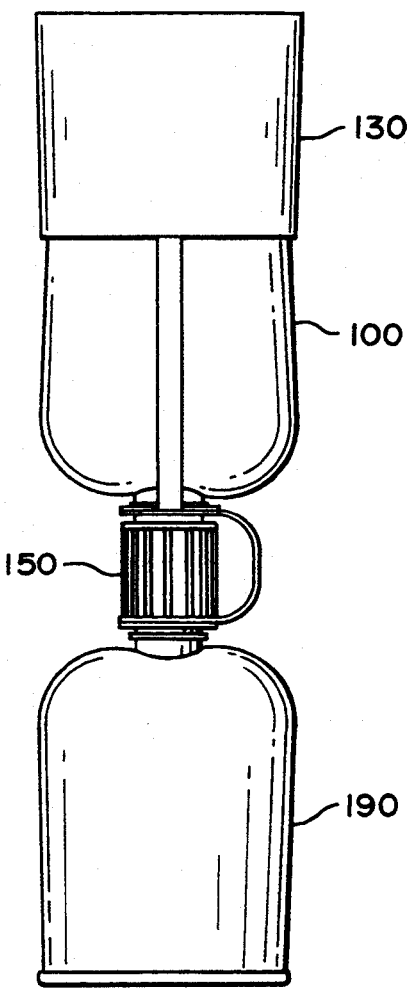
FIG. 12 is a side view of a purification system according to the present invention.

FIG. 12 illustrates the device of FIG. 11 with a water container 190 (like the container 90) secured to the connector 150 and positioned to receive purified water from the extender 130.

Figure 13:
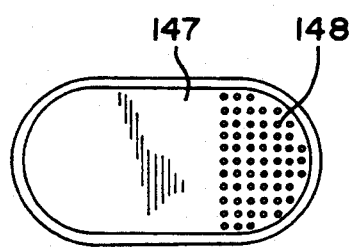
FIG. 13 is a top view of a filter body similar to that of FIG. 2A.

FIG. 13 illustrates another embodiment of a plate like the plate 47 (FIG. 2A). A plate 147 has a plurality of holes 148 which are about one sixteenth of an inch in diameter and are spaced apart by about 0.188 inches. In one embodiment the plate 147 is about 4.403 inches long, 2.403 inches wide, and 0.300 inches thick.

Figure 14:
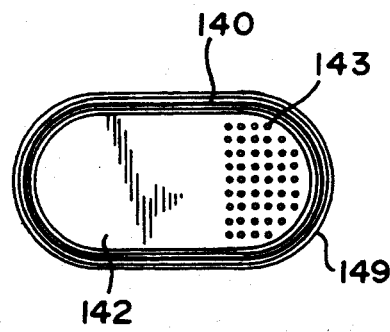
FIG. 14 is a top view of a filter apparatus similar to that of FIG. 4A.

FIG. 14 illustrates a filter holder 140 (like the filter holder 40) which has a side wall 149 and a plate 142. The plate 142 has a plurality of holes 143 therethrough. In one embodiment the holes are about one-sixteenth of an inch in diameter; the plate is about 3.969 inches long; about 1.969 inches wide; and about 0.060 inches thick.

Figure 15A:
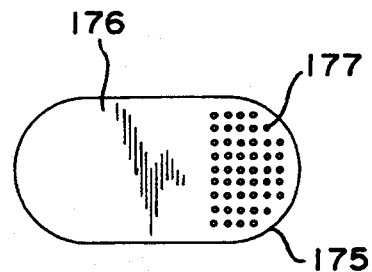
FIG. 15A is a top view of a filter screen according to the present invention.
Figure 15B:
FIG. 15B is a side view of the filter screen of FIG. 15A.

FIGS. 15A and 15B illustrate a plate 176 (like the plates 76) with a body 175 and a plurality of holes 177 therethrough. In one embodiment the plate 176 is 4.137 inches long; 2.125 inches wide; and three thirty seconds of an inch thick; and the holes 177 are about one sixteenth of an inch in diameter (for disposition as the bottom plate 76 is the device of FIG. 8). In another embodiment the plate 176 is about 4.029 inches long; and about 2.020 inches wide (for disposition as a top plate 76 in the device of FIG. 8).

Preferably an apparatus such as the apparatus 10 has a volume at least 50% (and most preferably 75%) that of a body 20 to which it is mountable. The various plates are designed and sufficient filter media material is used in one embodiment so that water takes about one minute to flow through the filter apparatus and into the container. In one embodiment the extender has an extender volume and the body has a body volume and the extender volume is at least 60% of the body volume.

Each of the plates or filter holders shown in FIGS. 13–15B have holes therethrough through only a portion thereof. Such items may be used, e.g. in a device as shown in FIG. 8 to further slow the passage of fluid to be filtered through the device. In one such embodiment the plates etc. may be disposed with portions with holes offset from each other to provide a more tortuous and lengthy path for fluid to be filtered. For example, the plate 47 and the bottom plate 76 in the device of FIG. 8 may have holes only in the right side thereof (as viewed in FIG. 8) while the top plate 76 and the plate 79 may have holes in only a left side thereof. By disposing and poisitoning holes in only a desired portion of a plate, a desired total flow time through the device may be achieved.

In conclusion, therefore, it is seen that the present invention, the embodiments disclosed herein, and those covered by the appended claims are well adapted to carry out the objectives and obtain the ends set forth. Certain changes can be made in the subject matter without departing from the spirit and the scope of this invention. It is realized that equivalents are possible within the scope of this invention and it is further intended that each element or step recited in any of the following claims is to be understood as referring to all equivalent elements or steps. The following claims are intended to cover the invention as broadly as legally possible.

What is claimed is:

1. A device for collecting and purifying water, the device comprising a hollow body defined by a body wall and having an open body top end and an open body bottom end, filter apparatus disposed within the body, the filter apparatus comprising a hollow apparatus having an open apparatus top end, an open apparatus bottom end, and filter means disposed therein for filtering water, the open apparatus bottom end of the hollow apparatus sealingly secured to an interior of the hollow body so that water introduced into the open body bottom end of the hollow body flows through the filter means when the hollow body is positioned upside down with the open body bottom end above the open body top end, a hollow extender removably nested in a first upright position about the hollow body, the extender having a hollow extender member, an open extender top end, and an open extender bottom end, the extender removable from nesting about the hollow body and invertible and emplaceable thereon in a second inverted position with the open body bottom end received in the open extender bottom end so that upon inversion of the device the hollow extender extends upwardly from the hollow body to facilitate collection of water to flow down into and through the hollow body.

2. The device of claim 1 comprising also the hollow body having a neck at the top end thereof, and connector means securable about the neck and securable to a water container for receiving and storing water flowed through the device.

3. The device of claim 1 wherein the hollow body tapers from top to bottom from a larger outer circumference to a smaller outer circumference, and the hollow extender body tapers from top to bottom from a larger outer circumference to a smaller outer circumference.

4. The device of claim 1 wherein the hollow extender has an extender volume and the hollow body has a body volume and the hollow extender volume is at least 50% of the body volume.

5. The device of claim 1 wherein the filter means comprises filter media secured within the hollow apparatus.

6. The device of claim 5 wherein the filter means comprises further a plate extending across an interior of the hollow apparatus, the plate having holes therethrough for the passage of water.

7. The device of claim 6 wherein the plate is positioned so that water flows through the plate prior to flowing through the filter media.

8. The device of claim 1 wherein the filter means comprises a plurality of plates spaced apart from each other and extending across an interior of the apparatus with filter media between each of two adjacent plates, the plates having holes therethrough for water passage.

9. The device of claim 8 wherein the plates and holes are positioned and configured to inhibit rate of water flow through the device so that water takes about one minute to flow through the filter apparatus.

10. The device of claim 1 comprising also a filtering disc removably disposed in the open extender bottom end of the hollow extender.

11. The device of claim 1 comprising also a cover removably secured to the open extender bottom end of the hollow extender for closing off the open extender bottom end of the hollow extender as it nests about the hollow body, the cover also thereby closing off the open body bottom end of the hollow body.

12. A water filtering system for purifying water, the system comprising a device for collecting and purifying water, the device comprising a hollow body defined by a body wall and having an open body top end and an open body bottom end, filter apparatus disposed within the hollow body, the filter apparatus comprising a hollow apparatus having an open apparatus top end, an open apparatus bottom end, and filter means disposed therein for filtering water, the open apparatus bottom end sealingly secured to an interior of the hollow body so that water introduced into the open body bottom end of the hollow body flows through the filter means when the hollow body is positioned upside down with the open body bottom end above the open body top end, a hollow extender removably nestable in a first upright position about the hollow body, the hollow extender having a hollow extender member, an open extender top end, and an open extender bottom end, the hollow extender removable from about the hollow body and invertible and emplaceable thereon in a second inverted position with the open body bottom end received in the open extender bottom end so that upon inversion of the device the hollow extender extends upwardly from the hollow body to facilitate collection of water to flow down into and through the hollow body, a water container for receiving and storing water which flows through the device, and connector means securable about the neck and securable to the water container to hold the device and the water container together for fluid communication therebetween.

13. The system of claim 12, the device comprising also a cover removably secured to the open extender bottom end of the hollow extender for closing off the open extender bottom end as it nests about the hollow body, the cover also thereby closing off the open body bottom end.

14. The system of claim 12 wherein the hollow body tapers from top to bottom from a larger outer circumference to a smaller outer circumference, and the extender member tapers from top to bottom from a larger outer circumference to a smaller outer circumference.

15. The system of claim 12 wherein the hollow extender has an extender volume and the hollow body has a body volume and the extender volume is at least 60% of the body volume.

16. The device of claim 12 comprising also a filtering disc removably disposed in the bottom end of the hollow extender.

17. The system of claim 12 wherein the filter means comprises filter media secured within the apparatus, and a plurality of plates spaced apart from each other and extending across an interior of the apparatus with filter media between each of two adjacent plates, the plates having holes therethrough for water passage, the plates positioned so that water flows through the plates prior to flowing through the filter media.

18. The device of claim 17 wherein the plates and holes are positioned and configured to inhibit rate of water flow through the device.

19. A device for collecting and purifying water, the device comprising a hollow body defined by a body wall and having an open body top end and an open body bottom end, filter apparatus disposed within the hollow body, the filter apparatus comprising a hollow apparatus having an open apparatus top end, an open apparatus bottom end, and filter media disposed therein for filtering water, the open apparatus bottom end sealingly secured to an interior of the hollow body so that water introduced into the open bottom end of the hollow body flows through the filter media when the hollow body is positioned upside down with the open body bottom end above the open body top end, a hollow extender removably nestable in a first upright position about the hollow body, the hollow extender having a hollow extender member, an open extender top end, and an open extender bottom end, the hollow extender removable from about the hollow body, invertible, and emplaceable thereon in a second inverted position with the open body bottom end received in the open extender bottom end so that upon inversion of the device the hollow extender extends upwardly from the hollow body to facilitate collection of water to flow down into and through the hollow body, the hollow body having a neck at the top end thereof, connector means securable about the neck and securable to a water container for receiving and storing water flowed through the device, a cover removably secured to the open extender bottom end of the hollow extender for closing off the open extender bottom end of the hollow extender as it nests about the hollow body, the cover also thereby closing off the open body bottom end, the hollow extender having an extender volume and the hollow body has a body volume and the extender volume is at least 75% of the body volume, and a filtering disc removably disposed in the bottom end of the hollow extender.

* * * * *